(12) United States Patent
Xiong et al.

(10) Patent No.: US 11,137,301 B2
(45) Date of Patent: Oct. 5, 2021

(54) OPTICAL FIBER FABRY-PEROT SENSOR, AND MANUFACTURING METHOD THEREOF

(71) Applicant: NORTH UNIVERSITY OF CHINA, Shanxi (CN)

(72) Inventors: Jijun Xiong, Shanxi (CN); Pinggang Jia, Shanxi (CN); Guocheng Fang, Shanxi (CN); Yingping Hong, Shanxi (CN); Ting Liang, Shanxi (CN); Qiulin Tan, Shanxi (CN); Wenyi Liu, Shanxi (CN)

(73) Assignee: North University of China, Shanxi (CN)

( * ) Notice: Subject to any disclaimer, the term of this patent is extended or adjusted under 35 U.S.C. 154(b) by 0 days.

(21) Appl. No.: 16/614,698

(22) PCT Filed: Nov. 13, 2017

(86) PCT No.: PCT/CN2017/110735
§ 371 (c)(1),
(2) Date: Nov. 18, 2019

(87) PCT Pub. No.: WO2019/090786
PCT Pub. Date: May 16, 2019

(65) Prior Publication Data
US 2020/0200624 A1    Jun. 25, 2020

(30) Foreign Application Priority Data

Nov. 13, 2017    (CN) .......................... 201711114757.3

(51) Int. Cl.
*G01L 1/24* (2006.01)
*G01L 11/02* (2006.01)
*G02B 6/38* (2006.01)

(52) U.S. Cl.
CPC ............ *G01L 1/242* (2013.01); *G01L 11/025* (2013.01); *G02B 6/3801* (2013.01)

(58) Field of Classification Search
CPC ...... G01L 1/242; G01L 11/025; G02B 6/3801
(Continued)

(56) References Cited

U.S. PATENT DOCUMENTS

2007/0006663 A1* 1/2007 Zerwekh ................ G01D 5/268
73/800
2014/0037261 A1    2/2014 Hyeon

FOREIGN PATENT DOCUMENTS

CN    103033200    4/2013
CN    103644987    3/2014
(Continued)

OTHER PUBLICATIONS

PCT Application No. PCT/CN2017/110735, International Search Report dated Jun. 27, 2018, 5 pages.

*Primary Examiner* — Jerry M Blevins
(74) *Attorney, Agent, or Firm* — Avant Law Group, LLC

(57) ABSTRACT

Some embodiments of the disclosure provide an optical fiber Fabry-Perot sensor (1), and a manufacturing method thereof. According to an embodiment, the optical fiber Fabry-Perot sensor (1) includes a hollow tube body (10), a first optical fiber (20), and a second optical fiber (30). The hollow tube body (10) has a first tube body (11), a cavity portion (12), and a second tube body (13) sequentially arranged in an axial direction. The first optical fiber (20) is provided within the first tube body (11) in the axial direction and has a first light guide end face (21) provided within the cavity portion (12). The second optical fiber (30) is provided in the second tube body (13) in the axial direction and has a second light guide end face (31) provided within the cavity portion (12).

13 Claims, 11 Drawing Sheets

(58) Field of Classification Search
USPC ............................................................ 385/12
See application file for complete search history.

(56) References Cited

FOREIGN PATENT DOCUMENTS

| CN | 203595666   |   | 5/2014  |            |
|----|-------------|---|---------|------------|
| CN | 105180980   |   | 12/2015 |            |
| CN | 105953958 A | * | 9/2016  | G01L 1/24  |
| CN | 107941390   |   | 4/2018  |            |

* cited by examiner

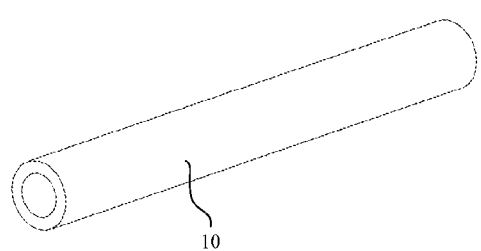
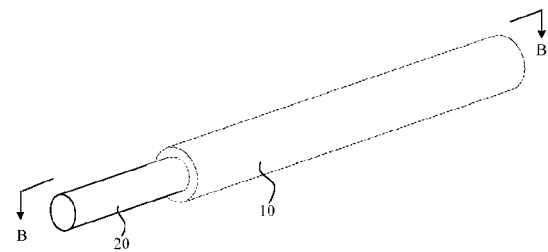
FIG.11a          FIG.11b
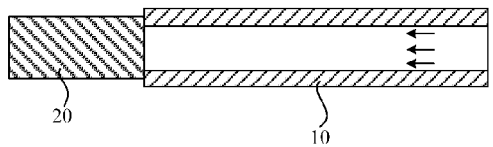
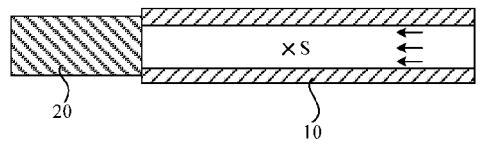
FIG.11c          FIG.11d
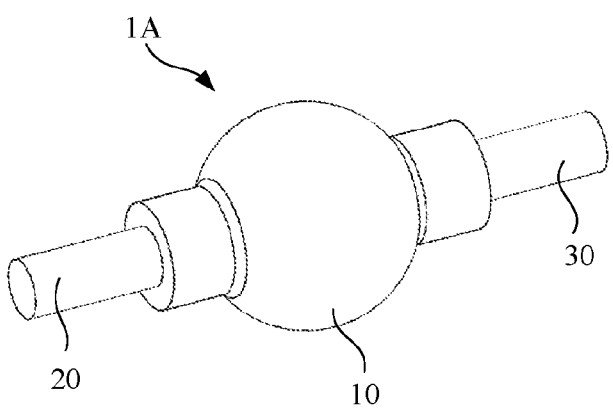
FIG.11e

OPTICAL FIBER FABRY-PEROT SENSOR, AND MANUFACTURING METHOD THEREOF

CROSS REFERENCE TO RELATED APPLICATIONS

This application is the United States national stage entry under 35 U.S.C. 371 of PCT/CN2017/110735 filed on Nov. 13, 2017, and further claims the Chinese priority number 201711114757.3 filed on Nov. 13, 2017, the disclosure of which are incorporated by references herein in their entireties.

FIELD OF THE DISCLOSURE

The disclosure relates generally to the field of an optical device. More specifically, the disclosure relates to an optical fiber Fabry-Perot sensor, and a manufacturing method thereof.

BACKGROUND

In recent years, with the rapid development in the fields of national defense, aerospace, energy, environment, electricity, automobiles, and the like, sensors are required to be miniaturize, energy-efficient, and resistant to harsh environments. Optical fiber sensors, which have advantages such as good stealth, high measurement accuracy and sensitivity, fast dynamic response speed, wide measurement range, intrinsic safety, immunity to electromagnetic interference, and the like, have attracted more and more attention.

At present, the most commonly used single-point optical fiber sensors mainly include fiber grating sensors, fiber Mach-Zehnder sensors, fiber Fabry-Perot sensors, and the like. However, the fiber grating sensor is sensitive to temperature, which can cause high cross-interference in actual practice (especially in high temperature environments). The fiber Mach-Zehnder sensor has been studied more because of its simple structure, but the sensitivity thereof is low and the size thereof is relatively large, which limits the actual practice thereof. In contrast, the fiber optic Fabry-Perot sensor is widely used due to the characteristic of small size, simple structure, and high sensitivity. The fiber Fabry-Perot strain sensor, fiber Fabry-Perot force sensor, and fiber Faber-Perot pressure sensor are widely used in the fields of national defense security, aerospace, and health monitoring of large construction. However, the sensitivity of existing fiber Fabry-Perot sensors is still not ideal, and has much room for improvement.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an optical fiber Fabry-Perot sensor including a hollow tube body, a first optical fiber, and a second optical fiber. The hollow tube has a first tube body, a cavity portion, and a second tube body sequentially arranged in an axial direction. The first optical fiber is provided inside the first tube body in the axial direction. The first optical fiber has a first light guide end face provided inside the cavity portion. The second optical fiber is provided inside the second tube body in the axial direction, and the second optical fiber has a second light guide end face provided inside the cavity portion. The first light guide end face and the second light guide end face are provided face to face at a preset distance. The inner diameter of the cavity portion is larger than the inner diameter of either one of the first tube body and the second tube body.

In other embodiments, the disclosure provides an optical fiber Fabry-Perot sensor including a hollow tube body, a first optical fiber, and a second optical fiber. The hollow tube body has a first tube body, a cavity portion, and a second tube body sequentially arranged in an axial direction. The first optical fiber has a first light guide end face connected with the end of the first tube body. The second optical fiber has a second light guide end face connected with the end of the second tube body. The first light guide end face and the second light guide end face are arranged face to face across the hollow tube body. The inner diameter of the cavity portion is larger than the inner diameter of either one of the first tube body and the second tube body.

Optionally, in the hollow tube body, the first light guide end face of the first optical fiber and the second light guide end face of the second optical fiber are provided within the cavity portion and spaced apart by a preset distance and arranged face to face. Therefore, during measuring, the change of external mechanical parameters (stress, tension, pressure, and the like) may be transmitted through the thin wall of the cavity portion, and the change of the corresponding mechanical parameters may be effectively reflected by the length of the Faber-Perot cavity, which is formed by the end face of the first optical fiber and the end face of the second optical fiber.

Optionally, the first light guide end face of the first optical fiber and the second light guide end face of the second optical fiber are respectively arranged at two ends of the hollow tube body. Therefore, during measuring, the change of external mechanical parameters (stress, tension, pressure, and the like) may be transmitted through the thin wall of the cavity portion, and the change of the corresponding mechanical parameters may be effectively reflected by the length of the Faber-Perot cavity, which is formed by the end face of the first optical fiber and the end face of the second optical fiber.

Optionally, the first optical fiber may be welded to the first tube, and the second optical fiber may be welded to the second tube. In this case, a sealed cavity may be effectively formed in the cavity portion of the first tube body and the second tube body, which may improve the measurement sensitivity of the absolute pressure.

Optionally, the first optical fiber and the second optical fiber may be a single-mode optical fiber, a multimode optical fiber, a polarization maintaining optical fiber, or a photonic crystal optical fiber. In this case, even if the first fiber and the second fiber are single-mode fiber, multimode fiber, polarization maintaining fiber, or photonic crystal fiber, the sensitivity may be ensured.

Optionally, the first tube body, the cavity portion, and the second tube body are continuously formed, and the central symmetry axis of the first tube body coincides with the central symmetry axis of the second tube body. In this case, because the first tube body, the cavity portion, and the second tube body are formed continuously, a more closed space may be formed by the first tube body, the cavity portion, and the second tube body, which may improve the sensitivity.

Optionally, the first light guide end face of the first optical fiber is perpendicular to the axis direction, and the second light guide end face of the second optical fiber is also perpendicular to the axis direction.

Optionally, the hollow tube body has a centrosymmetry line, and the cavity is formed into a rotationally symmetric structure around the center symmetry line. In this case, since the cavity portion is formed into a rotationally symmetrical structure around the centrosymmetric line, the cavity portion may uniformly sense the change of mechanical parameters, which may further improve the sensitivity of the optical fiber Fabry-Perot sensor.

Optionally, in the hollow tube body, more than two of the cavity portions are arranged between the first tube body and the second tube body in the hollow tube body. Therefore, the sensitivity of optical fiber Fabry-Perot sensor may be further improved.

Optionally, the first optical fiber and the hollow tube body form a first fusion joint, the second optical fiber and the hollow tube form a second fusion joint, and the hollow tube body is located between the first fusion joint and the second fusion joint.

Optionally, the first tube body, the cavity portion, and the second tube body are continuously formed, and the first tube body coincides with the central symmetric axis of the second tube body.

Optionally, the first tube body, the cavity portion, and the second tube body are integrally formed. In this case, the sealing performance of the hollow tube body may be improved, and the sensitivity of the sensor may be improved.

Optionally, the hollow tube body may be a quartz glass tube, a high temperature resistant glass tube, a hollow fiber, or a photonic crystal fiber. In this case, the high temperature resistance of the hollow tube may be improved and the applicability of the technology of the hollow tube body may be improved.

In further embodiments, the disclosure provides a manufacturing method of a fiber optic Fabry-Perot sensor including the following steps. Preparing a hollow tube body, and reducing the wall thickness at a preset position of the hollow tube body. Filling the hollow tube body with a thermally expansive material and sealing both ends of the hollow tube body. Heating the hollow tube body to thermally expand the preset position to form a cavity portion, thereby forming a hollow tube body containing a first tube body, a cavity portion, and a second tube body arranged in sequence. Fixing the first optical fiber to the first tube body. Fixing the second optical fiber to the second tube body. Bringing the first optical guide end face of the first optical fiber and the second optical guide end face of the second optical fiber to be provided in the cavity portion and separated at a preset distance.

Optionally, the wall thickness of the hollow tube body is reduced by thinning the preset position of the hollow tube body. Therefore, when the hollow tube body is filled with the thermally expansive material and heated, the hollow tube body of the preset position will expand to form a cavity portion. It may help to improve the sensitivity of an optical fiber Fabry-Perot sensor by welding the first optical fiber and the second optical fiber to the hollow tube body, and bringing the first light guide end face of the first optical fiber and the second light guide end face of the second optical fiber arranged separately.

In some embodiments, the disclosure provides a manufacturing method of a fiber optic Fabry-Perot sensor including the following steps. Preparing a hollow tube body, and reducing the wall thickness at a preset position of the hollow tube body. Filling the hollow tube body with a thermally expansive material and sealing both ends of the hollow tube body. Heating the hollow tube body to thermally expand the preset position to form a cavity portion, thereby forming a hollow tube body containing a first tube body, a cavity portion, and a second tube body arranged in sequence. Fixing the end face of the first optical fiber to the end face of the first tube body. Fixing the end face of the second optical fiber to the end face of the second tube body. Bringing the end face of the first optical fiber and the end face of the second optical fiber into face to face.

Optionally, the wall thickness of the hollow tube body is reduced by thinning the preset position of the hollow tube body. Therefore, when the hollow tube body is filled with the thermally expansive material and heated, the hollow tube body of the preset position will expand to form a cavity portion. It may help to improve the sensitivity of an optical fiber Fabry-Perot sensor by welding the first optical fiber and the second optical fiber to the hollow tube body, and bringing the first light guide end face of the first optical fiber and the second light guide end face of the second optical fiber arranged separately.

Optionally, the thermally expansive material may be air, inert gas, or gasifiable material. Therefore, the cavity portion may be easily produced by heating.

Optionally, the reducing step is accomplished by processing method of etching, laser, plasma or sand blasting. In this case, the reducing step of the hollow tube body may be easily achieved.

Optionally, the reducing step may include the following steps. Patterning the outer wall of the preset position of the hollow tube body to form an etching window on the preset position. Etching the patterned hollow tube body to form a groove structure at the preset position, such that the wall thickness of the preset position is less than the wall thickness around the preset position. In this case, the wall thickness of the hollow tube body may be reduced by etching process, so that the cavity portion may be easily prepared.

Optionally, the patterning step may include the following steps. Coating a protective layer on the outer wall of the hollow tube body. Rotating the hollow tube coated with the protective layer around the central axis of the hollow tube body and performing mask etching. Developing the protective layer and removing the protective layer of the preset position. In this case, the etching process may be used to easily select the preset position, which may improve the applicability of Fabry-Perot sensor manufacture.

Optionally, the hollow tube body may be a quartz glass tube, a high temperature resistant glass tube, a hollow fiber, or a photonic crystal fiber. In this case, the high temperature resistance of the hollow tube may be improved and the applicability of the technology of the hollow tube body may be improved.

In other embodiments, the disclosure provides a manufacturing method of an optical fiber Fabry-Perot sensor including the following steps. Preparing a hollow tube body, and inserting a first optical fiber into and sealing one end of the hollow tube body. Connecting the other end of the hollow tube body to thermally expand the preset position to form a cavity portion, thereby forming a hollow tube body containing a first tube body, the cavity portion, and a second tube body arranged in sequence. Inserting and fixing a second optical fiber into the second tube body, and bringing the end face of the first optical fiber and the end face of the second optical fiber to be provided in the cavity portion and separated at a preset distance.

Optionally, a hollow tube body having a first tube body, a cavity portion, and a second tube body is formed by discharging at a preset position of the hollow tube body. Moreover, the end face of the first optical fiber and the end face of the second optical fiber are arranged at a preset distance within the cavity portion, which may form an optical fiber Fabry-Perot sensor with improved sensitivity.

In further embodiments, the disclosure provides a manufacturing method of an optical fiber Fabry-Perot sensor including the following steps. Preparing a hollow tube body, and fixing the end face of a first optical fiber at one end of the hollow tube body and sealing the end of the hollow tube body. Connecting the other end of the hollow tube body with a high voltage source. Performing discharge for the hollow tube body to thermally expand the preset position to form a cavity portion, thereby forming a hollow tube body containing a first tube body, the cavity portion, and a second tube body arranged in sequence. Fixing the end face of a second optical fiber at the second tube body and sealing the second tube body.

Optionally, a hollow tube body having a first tube body, a cavity portion, and a second tube body is formed by discharging at a preset position of the hollow tube body. Moreover, the end face of the first optical fiber is separated from the end face of the second optical fiber by the hollow tube body, which may form an optical fiber Fabry-Perot sensor with improved sensitivity.

Optionally, during discharging the hollow tube body, the hollow tube body may be discharged at a plurality of preset positions to form a plurality of cavity portions. Therefore, the measurement sensitivity may be further improved.

According to an embodiment, an optical fiber Fabry-Perot sensor with high sensitivity and the manufacturing method thereof are provided.

BRIEF DESCRIPTION OF THE DRAWINGS

Illustrative embodiments of the present disclosure are described in detail below with reference to the attached drawing figures.

FIG. 11a is a stereoscopic diagram illustrating the starting hollow tube body.

FIG. 11b is a stereoscopic diagram illustrating that the first optical fiber is fixed and the hollow tube is sealed.

FIG. 11c is a sectional diagram illustrating the section along line C-C shown in FIG. 11b.

FIG. 11d is an interception diagram illustrating the discharge performance of the hollow tube body shown in FIG. 11c.

FIG. 11e is a stereoscopic diagram illustrating the prepared hollow tube body.

DETAILED DESCRIPTION

Figure 1:
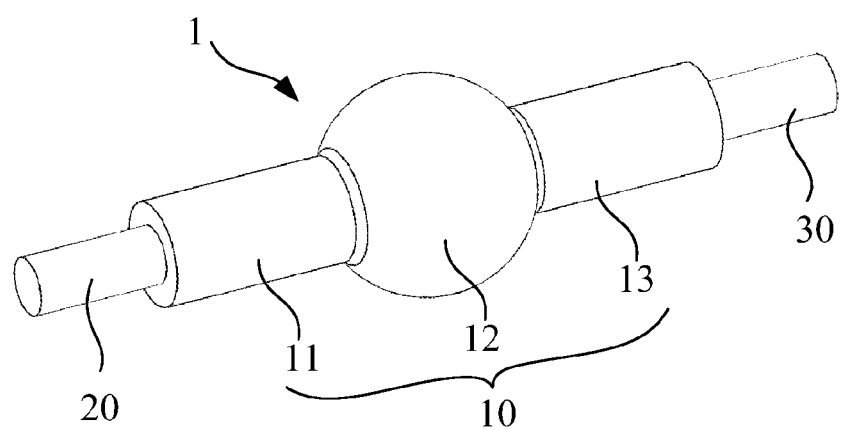
FIG. 1 is a schematic diagram illustrating the stereoscopic structure of the optical fiber Fabry-Perot sensor according to the first embodiment.

The following describes some non-limiting exemplary embodiments of the invention with references to the accompanying drawings. The described embodiments are merely a part rather than all of the embodiments of the invention. All other embodiments obtained by a person of ordinary skill in the art based on the embodiments of the disclosure shall fall within the scope of the disclosure.

Embodiments of the disclosure are described in detail with reference to the accompanying drawings. As shown in the drawings, 1 and 1A represent optical fiber Fabry-Perot sensor, 10 represents hollow tube body, 11 represents tube body (or first tube body), 12 represents cavity portion, 13 represents tube body (or second tube body), 20 represents optical fiber (or first optical fiber), 21 represents internal end face (or first end face), 22 represents external end face, 30 represents optical fiber (or second optical fiber), 31 represents internal end face (or second end face), and 32 represents external end face.

In the following description, the same components are denoted by the same reference numerals, and the description thereof will not be repeated. In addition, the drawings are merely schematic views, and the ratio of the dimensions of the components to each other or the shape of the components may be different from the actual ones.

First Embodiment

Figure 2:
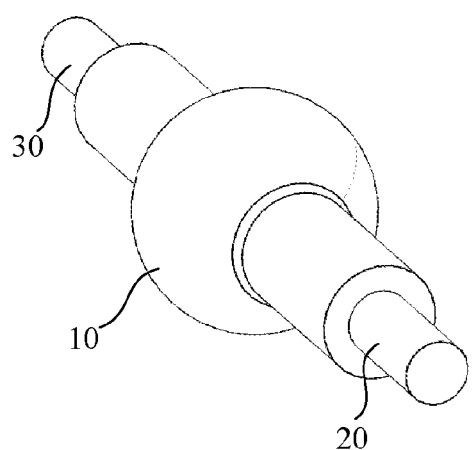
FIG. 2 is another schematic diagram illustrating the stereoscopic structure of the optical fiber Fabry-Perot sensor according to the first embodiment.

FIG. 1 is a schematic diagram illustrating the stereoscopic structure of the optical fiber Fabry-Perot sensor according to the first embodiment. FIG. 2 is a schematic diagram illustrating another stereoscopic structure of the optical fiber Fabry-Perot sensor. In FIG. 1 and FIG. 2, only part of an optical fiber is shown for convenience. In actual practices, the length of the optical fiber may be determined according to the actual situation. The following example uses the same representation.

As shown in FIG. 1 and FIG. 2, the optical fiber Fabry-Perot sensor 1 may include a hollow tube body 10, a first optical fiber 20, and a second optical fiber 30, which are arranged on two sides of the hollow tube body 10. That is, the first optical fiber 20 and the second optical fiber 30 are respectively inserted into the hollow tube body 10 from two sides of the hollow tube body 10 and installed (fixed) in the hollow tube body 10 (see FIG. 4 described later). In some examples, the first optical fiber 20 and the second optical fiber 30 may respectively seal the hollow tube body 10 from both sides, thereby forming a sealed space within the hollow tube body 10.

As shown in FIG. 1, the hollow tube body 10 may have a first tube body 11, a cavity portion 12, and a second tube body 13 arranged sequentially along the axial direction thereof. In other words, the cavity portion 12 is provided between the first tube body 11 and the second tube body 13. The first tube body 11, the cavity section 12, and the second tube body 13 are connected in turn.

Optionally, the hollow tube body 10 described herein is not limited to the case where the inner diameter thereof is completely unchanged. For example, as described below, the part of the hollow tube body at the preset position is formed by expansion and the shape of the expansion part is more likely to be spherical or irregular.

Figure 3:
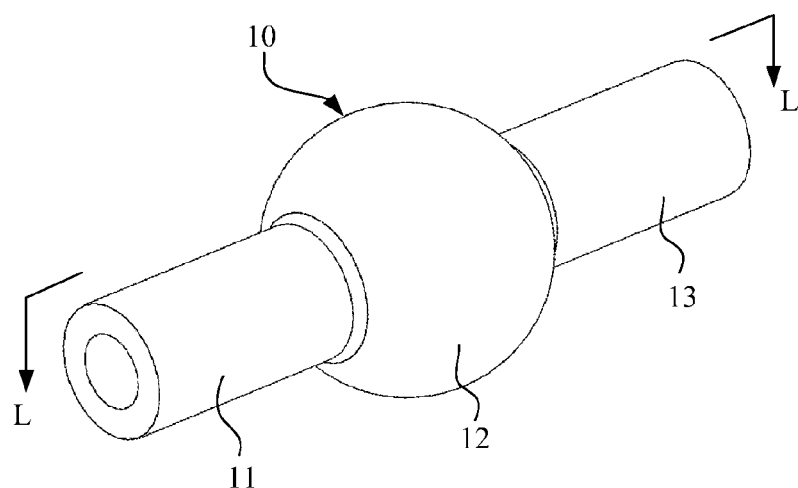
FIG. 3 is a schematic diagram illustrating the stereoscopic structure of the hollow tube body of the optical fiber Fabry-Perot sensor according to the first embodiment.
Figure 4:
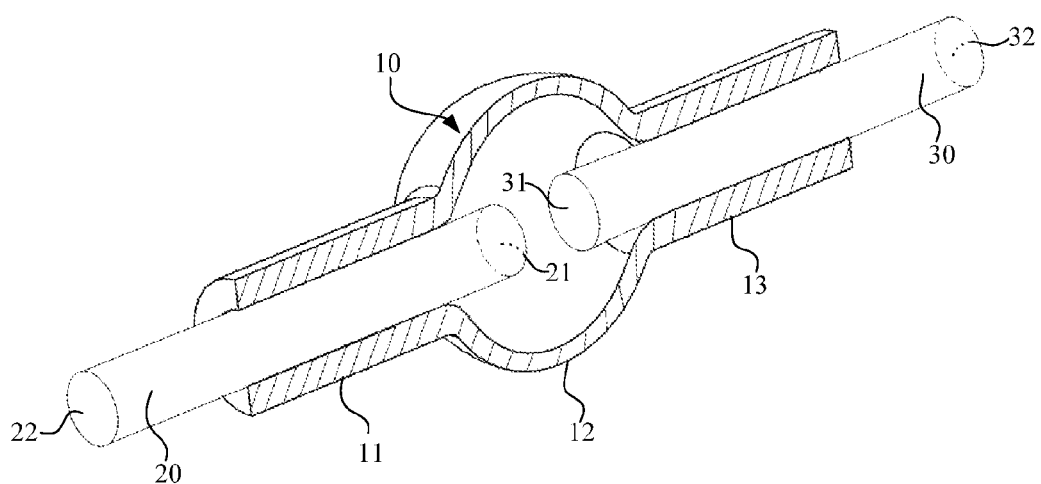
FIG. 4 is a schematic diagram illustrating the cross section of the hollow tube body along the line L-L shown in FIG. 3.

FIG. 3 is a schematic diagram illustrating the stereoscopic structure of the hollow tube body of the optical fiber Fabry-Perot sensor. FIG. 4 is a schematic diagram illustrating the cross section of the hollow tube body along the line L-L shown in FIG. 3. In FIG. 4, the stereoscopic diagrams of the optical fiber (including the first optical fiber 20 and the second optical fiber 30) are also shown.

The first optical fiber 20 may be provided within the first tube body 11 along the axial direction, and the second optical fiber 30 may be provided within the second tube body 13 along the axial direction. As shown in FIG. 1, the first optical fiber 20 has an internal end face (i.e. the first light guide end face) 21 arranged within the cavity portion 12 and an external end face 22 arranged far from the cavity portion 12 (see FIG. 4). The second optical fiber 30 has an internal end face (the second light guide end face) 31 arranged within the cavity portion 12 and an external end face 32 arranged far from the cavity portion 12 (see FIG. 4).

The external end face 22 of the first optical fiber 20 and the external end face 32 of the second optical fiber 30 are shown only for illustration. The end of the first optical fiber 20 containing the external end face 22 and the end of the first optical fiber 30 containing the external end face 32 may be respectively connected to external devices, such as optical signal processing devices (e.g. a spectrometer (not shown)), thereby the optical signals captured by the first optical fiber 20 and the second optical fiber 30 may be detected and displayed (for example, displayed on a display screen). Optionally, in some examples, the optical signal processing device may also be integrated with the optical fiber Fabry-Perot sensor 1, thereby, for example, the data of the optical fiber Fabry-Perot sensor 1 may be acquired in real time by reading the optical signal processing device.

The first light guide end face 21 and the second light guide end face 31 may be provided face to face at a preset distance D (see FIG. 4). Since the optical signal passes through the first light guide end face 21 of the first optical fiber 20 and the second light guide end face 31 of the second optical fiber 30, and correspondingly generates transmitted light, reflected light and interference light. Therefore, the first light guide end face 21 of the first optical fiber 20 and the second light guide end face 31 of the second optical fiber 30, which are provided face to face, may form a Fabry-Perot cavity. When the external environment changes, optical fibers (the first optical fiber 20 and the second optical fiber 30) located on two sides of the cavity portion 12 are subjected to forces such as tension or extrusion force, causing the shape of the cavity portion 12 to change and the distance D between the two internal ends (the first light guide end face 21 and the second light guide end face 31) of the Fabry-Perot cavity formed by the first optical fiber 20 and the second optical fiber 30 to change, thereby changing the interference spectrum. By demodulating the interference spectrum, the dependent variable of the external environment may be measured.

Optionally, in some examples, the first optical fiber 20 may be used as an input optical fiber and the second optical fiber 30 may be used as a receiving optical fiber. However, the present embodiment is not limited thereto. For example, the second optical fiber 30 may be used as an input optical fiber and the first optical fiber 20 may be used as a receiving optical fiber.

The preset distance D between the first light guide end face 21 and the second light guide end face 31 is not particularly limited. In some examples, the preset distance D may be 5 μm to 100 μm (micron), preferably 5 μm to 20 μm. In this case, the change of interference spectrum generated by Fabry-Perot cavity may be detected more accurately. In some examples, the preset distance D may be 5 μm, 10 μm, 20 μm, 50 μm, 80 μm, or 100 μm.

Optionally, in some examples, the wall thickness of the cavity portion 12 may be thinner than that of any of the first tube body 11 next to the cavity portion 12 and the second tube body 13 next to the cavity portion 12 (see FIG. 4). The inner diameter of the cavity portion 12 may be larger than that of any of the first tube body 11 and the second tube body 13. In these cases, the wall thickness of the cavity portion 12 may be ensured to be thinner than that of the first tube body 11 or the second tube body 13, so that the cavity portion 12 may sensitively sense the change of the external measured mechanical parameters when subjected to external forces, which may improve the sensitivity (or measurement sensitivity). The measured mechanical parameters may include, for example, tension, compression, bending, torsion, impact, alternating stress, and the like.

Optionally, the wall thickness of the cavity portion 12 may be 1 μm to 10 μm, preferably 2 μm to 8 μm. In this case, the sensitivity of optical fiber Fabry-Perot sensor 1 may be improved. In some examples, the wall thickness of the cavity portion 12 may be 1 μm, 2 μm, 4 μm, 5 μm, 6 μm or 8 μm, 10 μm.

Optionally, the wall thickness of the cavity portion 12 do not have to be uniform, for example, the central wall thickness of the cavity portion 12 is the thinnest, and the wall thickness closer to the first tube body 11 or the second tube body 13 gradually becomes thicker.

Optionally, the inhomogeneous of wall thickness of the cavity portion 12 may be caused by thermal expansion process. In the process of thermal expansion, the inhomogeneous of wall thickness of cavity portion 12 may be caused by uneven heating or force.

As mentioned above, in the hollow tube body 10, the first light guide end face 21 of the first fiber 20 and the second light guide end face 31 of the second fiber 30 are provided within the cavity portion 12 of the hollow tube body 10, and are arranged face to face at a preset distance D. Therefore, when measuring mechanical parameters such as stress by the optical fiber Fabry-Perot sensor 1, the corresponding changes of mechanical parameters may be effectively obtained by the change of the length of the Fabry-Perot cavity formed by the first optical fiber 20 and the second optical fiber 30. Therefore, the sensitivity of the optical fiber Fabry-Perot sensor 1 may be effectively improved.

Optionally, the wall thickness of the cavity portion 12 may be thinner than that of any of the first tube body 11 next to the cavity portion 12 and the second tube body 13 next to the cavity portion 12. The variation of the external measured mechanical parameters may be transmitted through the thin wall of the cavity portion 12. Therefore, the sensitivity of the optical fiber Fabry-Perot sensor 1 may be further improved.

The hollow tube body 10 is optionally a quartz glass tube. In this case, the quartz structure of the hollow tube body 10 may improve the high temperature resistance of the hollow tube body and the technological applicability of the hollow tube body. As is well-known, the main component of quartz glass tube is silica. Silica is common materials in microelectronic process or Micro-Electro-Mechanical System (MEMS) technology, thus, using quartz glass tube as main processing material may not only improve the high temperature resistance capability of the hollow tube body, but also improve the technological applicability of the hollow tube body. In addition, the fiber optic Fabry-Perot sensor 1 made from quartz glass tube may also have a lower temperature coefficient.

Optionally, in some examples, the hollow tube body 10 may also be high temperature resistant glass tube, hollow optical fiber, photonic crystal fiber, and the like.

Optionally, the first light guide end face (internal end face) 21 of the first optical fiber 20 and the second light guide end face (internal end face) 31 of the second optical fiber 30 may be a plane vertically cut. That is, the first light guide end face 21 of the first optical fiber 20 is parallel to the second light guide end face 31 of the second optical fiber 30.

Optionally, the first light guide end face 21 of the first optical fiber 20 and the second light guide end face 31 of the second optical fiber 30 may adjust the spectral characteristics by optical coating to improve the optical characteristics of the light guide end face of the optical fiber. In some examples, yttrium fluoride, praseodymium fluoride, germanium, zinc sulfide, magnesium fluoride, titanium dioxide, zirconia, and the like may be formed on surfaces of the first light guide end face 21 and the second light guide end face 31 as optical coating, which may be selected according to actual practice.

In the hollow tube body 10, for example, when the incident light from the laser equipment propagates to the first light guide end face (internal end face) 21 of the first optical fiber 20, part of the light is reflected back to the first optical fiber 20, and part of the light passes through the light guide end face 21 of the first optical fiber 20 and reaches to the second light guide end face (internal end face) 31 of the second optical fiber 30, at which time part of light is reflected back and another part of light is coupled into the second optical fiber 30. At this time, the interference is happened in the Fabry-Perot cavity between the first light guide end face 21 of the first optical fiber 20 and the second light guide end face 31 of the second optical fiber 30. When strain of the external environmental occurs, the first optical fiber 20 located on side of the first tube body 11 and the second optical fiber 30 located on side of the second tube body 13 are subjected to, for example, tension or extrusion force, resulting in a change of the shape of the cavity portion 12. When the distance between the first light guide end face 21 of the first optical fiber 20 and the second light guide end face 31 of the second optical fiber 30 changes, the interference spectrum changes as a result. By demodulating the interference spectrum, the external environment strain may be measured.

The outer diameter of the first optical fiber 20 may match the inner diameter of the first tube body 11 of the hollow tube body 10, and the outer diameter of the second optical fiber 30 may match the inner diameter of the first tube body 13 of the hollow tube body 10. In this case, the first optical fiber 20 and the second optical fiber 30 may be respectively installed adaptively to each side of the hollow tube body 10. That is, the first optical fiber 20 is adaptively installed in the first tube body 11, and the second optical fiber 30 is adaptively installed in the second tube body 13.

In some examples, in the optical fiber Fabry-Perot sensor 1, the first optical fiber 20 may be inserted into the first tube body 11 and seal the first tube body 11, and the second optical fiber 30 may be inserted into the second tube body 13 and seal the second tube body 13. In these cases, a sealed space may be formed in the hollow tube body 10, which may improve the sensitivity of measurement, such as the measuring sensitivity of absolute pressure.

Optionally, the first tube body 11, the cavity portion 12, and the second tube body 13 may be formed continuously. In other words, the first tube body 11, the cavity portion 12, and the second tube body 13 may form an intact junction surface without any gap therebetween. In this case, since the first tube body 11, the cavity portion 12, and the second tube body 13 are formed continuously. Therefore, the first tube body 11, the cavity portion 12, and the second tube body 13 may form a more enclosed space, which may improve the sensitivity of measurement.

Optionally, the central symmetry axis of the first tube body 11 may coincide with the central symmetry axis of the second tube body 13. In this case, the alignment of the first optical fiber 20 provided within the first tube body 11 and the second optical fiber 30 provided within the second tube body 13 may be easily achieved, which is more convenient for the measurement of the mechanical parameters.

Optionally, the first optical fiber 20 may be welded to the first tube body 11, and the second optical fiber 30 may be welded to the second tube body 13. In this case, the first tube body 11 and the second tube body 13 may be firmly fixed on each side of the hollow tube body 10, respectively.

In the present embodiment, there is no particular limitation to the way in which the first optical fiber 20 is welded to the first tube body 11 and the second optical fiber 30 is welded to the first tube 13. In some examples, the first optical fiber 20 may be welded to and fixed in the first tube body 11 by laser welding, and the second optical fiber 30 may also be welded to and fixed in the second tube body 13 by laser welding. Laser welding is particularly suitable for the case where the first tube body 11 and the second tube body 13 are quartz glass tubes.

Specifically, for the method of welding the first optical fiber 20 to the first tube body 11, for example, the first optical fiber 20 may be inserted into the first tube body 11 firstly, and a laser source (such as a pulsed laser source) may be used to irradiate the specified position of the first optical fiber 20 around the axial direction of the first optical fiber 20, resulting in a partial melting state of the first optical fiber 20, so that the first optical fiber 20 may be well welded to the first tube body 11. Similarly, the second optical fiber 30 may be inserted into the second tube body 13, and a laser source (such as a pulsed laser source) may be used to irradiate the second optical fiber 30 around the axial direction of the second optical fiber 30, resulting in a partial melting state of the second optical fiber 30, so that the second optical fiber 30 may be well welded to the second tube body 13.

Optionally, the first optical fiber 20 and the second optical fiber 30 may be single mode fibers or multimode fibers. That is, the first optical fiber 20 and the second optical fiber 30 may be single mode fibers. In addition, the first optical fiber 20 and the second optical fiber 30 may also be multimode fibers. Generally, single mode fiber transmits only one mode. With little attenuation and long transmission distance, the transmission rate of single mode fiber is higher than that of multimode fiber, and the core diameter of the single mode fiber is smaller than that of multimode fiber. To the contrary, multimode fiber may transmit multiple modes, but has large attenuation and short transmission distance. Single mode or multimode fibers may be selected according to situations.

Optionally, the first optical fiber 20 and the second optical fiber 30 may also be polarization maintaining fibers or photonic crystal fibers. In some examples, the first optical fiber 20 and the second optical fiber 30 may be other types of optical fibers besides single mode fibers, multimode fibers, polarization maintaining fibers and photonic crystal fibers.

Optionally, the first light guide end face 21 of the first optical fiber 20 may be perpendicular to the axial direction of the hollow tube body 10, and the second light guide end face 31 of the second optical fiber 30 may be perpendicular to the axial direction of the hollow tube body 10. In this case, the light guiding path of the first optical fiber 20 and the second optical fiber 30 may be guaranteed to be approximately parallel to the axial direction of the hollow tube body 10, thereby ensuring the measurement sensitivity of the Fabry-Perot cavity formed by the first light guide end face 21 of the first optical fiber 20 and the second light guide end face 22 of the second optical fiber 20.

The first light guide end face 21 of the first optical fiber 20 may be a smooth surface, and the second light guide end face 31 of the second optical fiber 30 may be a smooth surface. In this case, the optical signal may be transmitted from the first light guide end face 21 of the first optical fiber 20, and may pass through and be reflected from the second light guide end face 31 of the second optical fiber 30, so that a Fabry-Perot cavity is formed between the first light guide end face 21 and the second light guide end face 31 to generate interference light wave, and part of optical signals propagate along the second optical fiber 30.

In some examples, the first light guide end face 21 of the first optical fiber 20 may have an optical coating, and the second light guide end face 31 of the second optical fiber 30 may have an optical coating. In these cases, the optical properties of the first light guide end face 21 and second light guide end face 31 may be improved, and the measurement sensitivity may be further improved.

Optionally, the hollow tube body 10 may have a centrosymmetric line, and the cavity portion 12 may form a rotational symmetric structure around the centrosymmetric line. In this case, since the cavity portion 12 is a rotational symmetrical structure around the centrosymmetric line thereof, the cavity portion 12 may uniformly sense the change of external stress, which may improve the sensitivity of the optical fiber Fabry-Perot sensor 1.

In some examples, the cavity portion 12 may roughly be a hollow sphere or a hollow elliptical sphere. In this case, the cavity portion 12 may more uniformly sense the change of external stress, which may improve the sensitivity of the optical fiber Fabry-Perot sensor 1.

Figure 5:
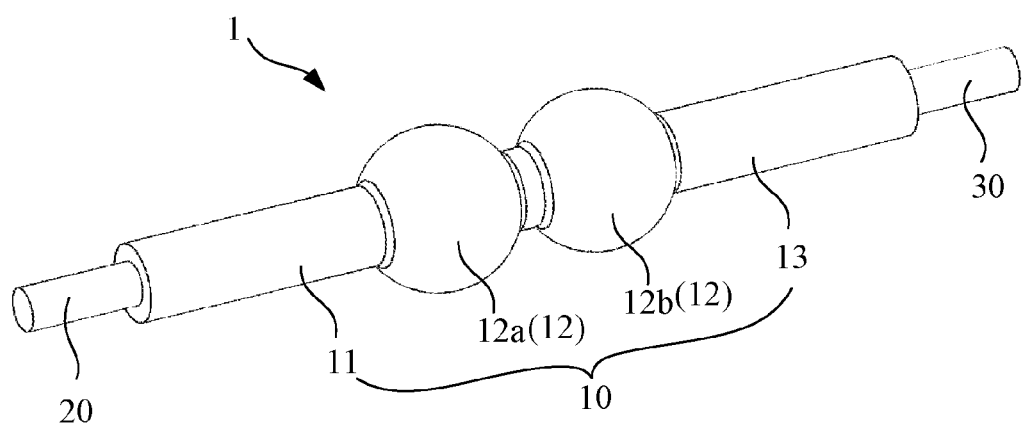
FIG. 5 is a schematic diagram illustrating the stereoscopic structure of a variation of the optical fiber Fabry-Perot sensor according to the first embodiment.

FIG. 5 is a schematic diagram illustrating the stereoscopic structure of a variation of an optical fiber Fabry-Perot sensor.

In the hollow tube body, more than two cavity portions is provided between the first tube body 11 and the second tube body 13. In some examples, as shown in FIG. 5, a cavity portion 12a and a cavity portion 12b are provided between the first tube body 11 and the second tube body 13. In these cases, the sensitivity of the optical fiber Fabry-Perot sensor may be further improved.

The cavity portion 12a and the cavity portion 12b may have completely identical or symmetrical shapes. In this case, the sealed space formed by the cavity portion 12a and the cavity portion 12b may also improve the sensitivity of measurement.

The cavity portion 12a and the cavity portion 12b may be formed continuously. In addition, in some examples, the cavity portion 12a and the cavity portion 12b may have overlapping parts.

In some examples, three, five or more cavity portions may be provided between the first tube body 11 and the second tube body 13. The specific number of cavity portions may be selected according to the sensitivity and accuracy need of actual practice. The plurality of cavity portions may have overlapping parts therebetween.

Optionally, the first optical fiber 20 and the hollow tube body 10 may form a first fusion joint 41. The second optical fiber 30 and the hollow tube body 10 may form a second fusion joint 42. A hollow tube body 10 exists between the first fusion joint 41 and the second fusion joint 42. In this case, the measurement sensitivity of the optical fiber Fabry-Perot sensor 1 may be further improved.

In view of the sealing property and convenient manufacture, the first tube body 11, the cavity portion 12, and the second tube body 13 may optionally be integrally formed. In this case, the sealing property of the hollow tube body 10 may be improved, and the sensitivity of the optical fiber Fabry-Perot sensor 1 may be improved. In some examples, the first tube body 11, the cavity portion 12, and the second tube body 13 may be formed by one tube.

Moving on, FIG. 6 and FIG. 7a-7e describe a manufacturing method of the optical fiber Fabry-Perot sensor.

Figure 6:
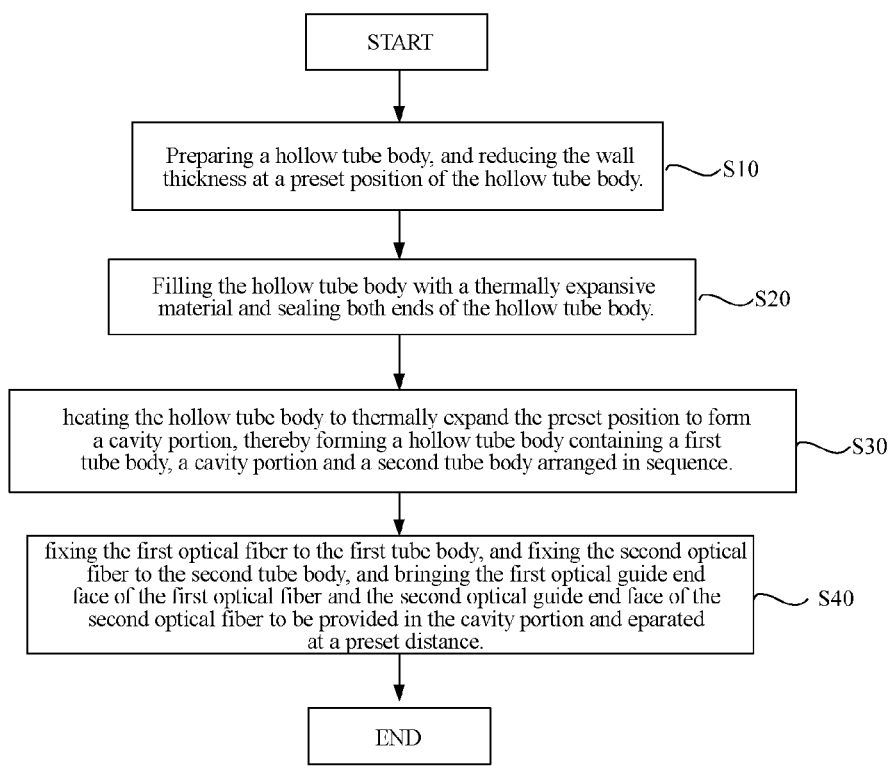
FIG. 6 is a flowchart illustrating a manufacturing method of the optical fiber Fabry-Perot sensor according to the first embodiment.

FIG. 6 is a flowchart illustrating a manufacturing method of the optical fiber Fabry-Perot sensor according to the present embodiment. FIG. 7a-7e are diagrams illustrating manufacturing method of the hollow tube body of the fiber optic Fabry-Perot sensor involved in the present embodiment.

In the disclosed manufacturing method of the optical fiber Fabry-Perot sensor 1, the hollow tube body 10 is prepared at first, and the wall thickness of the hollow tube body, which part is located at the preset position of the hollow tube body 10, is reduced (step S10). Optionally, the prepared hollow tube body may be a quartz glass tube. In this case, it may ensure the high temperature resistance of the hollow tube body and improve the technological applicability of the hollow tube body.

In some examples, the preset position may be approximately the central position of the hollow tube body. Optionally, the reducing method in S10 may be accomplished by processing method of etching, laser, plasma or sand blasting. In this case, the reducing step of the hollow tube body may be easily accomplished.

In step S10, the reducing steps may include the following steps. Patterning the outer wall of the preset position of the hollow tube body to form an etching window on the preset position. Etching the patterned hollow tube body to form a groove structure at the preset position, such that the wall thickness of the preset position is less than the wall thickness around the preset position. In this case, the wall thickness of the hollow tube body may be reduced by etching process, thereby the cavity portion may be easily prepared.

In step S10, the patterning steps may include the following steps. Coating a protective layer on the outer wall of the hollow tube body. Rotating the hollow tube coated with the protective layer around the central axis of the hollow tube body and performing mask etching. Developing the protective layer and removing the protective layer of the preset position. In this case, the selection of the preset position may be easily achieved, which may improve the applicability of fiber Fabry-Perot sensor manufacture.

Figure 7A:
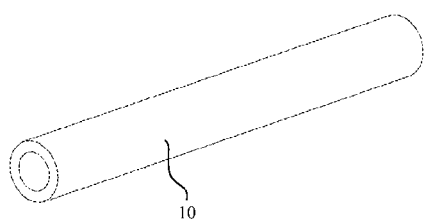
FIG. 7a is a stereoscopic diagram illustrating the starting hollow tube body.
Figure 7B:
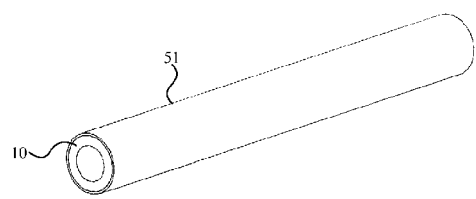
FIG. 7b is a stereoscopic diagram illustrating the hollow tube body coated with a protective layer.
Figure 7C:
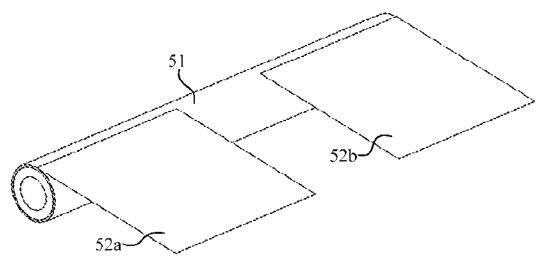
FIG. 7c is a stereoscopic diagram illustrating the hollow tube covered with plastic film.
Figure 7D:
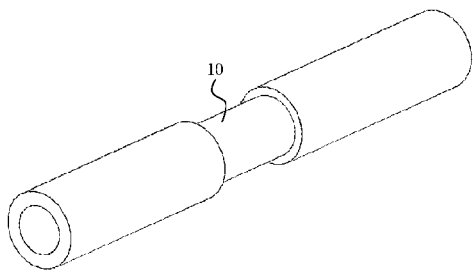
FIG. 7d is a stereoscopic diagram illustrating the hollow tube body after removing the protective layer.
Figure 7E:
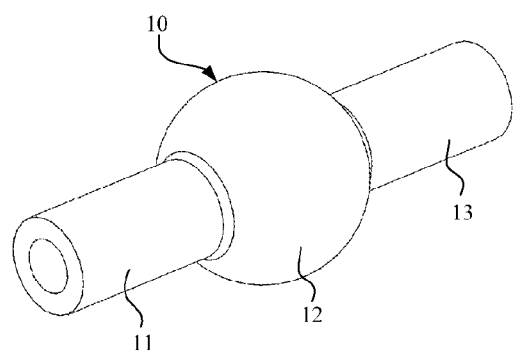
FIG. 7e is a stereoscopic diagram illustrating the prepared hollow tube body.
Figure 8:
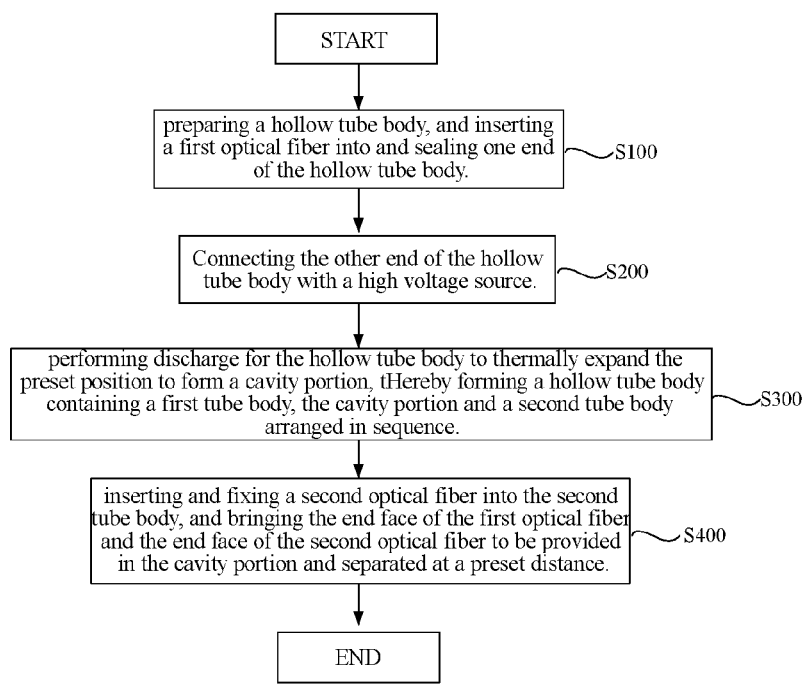
FIG. 8 is a flowchart illustrating another manufacturing method of the optical fiber Fabry-Perot sensor according to the first embodiment.

Referring to FIGS. 7a and 7b, a protective layer 51 is coated on the prepared hollow tube body 10, such as a hollow quartz glass tube, and then a mask layer is adhered to the protective layer 51 (see the mask layer 52a and 52b in FIG. 7c). Then, the development exposure is performed and the protective layer 51 of the preset position of the hollow tube body 10 is removed. Then, the etching process (such as dry etching, wet etching) is performed so that the wall thickness of the exposed hollow tube body of the preset position is reduced, and the hollow tube body 10 with a depression shown in FIG. 7d is obtained.

In the above example, the mask layer may be a plastic film. As a result, the etching mask may be easily achieved and the cost of etching process may be greatly saved. In other examples, the protective layer may also be a photo resist sensitive to ultraviolet rays.

Then, thermally expansive material is filled into the hollow tube body 10 and both ends of the hollow tube body are sealed (step S20). In step S20, the thermal expansive material may be air, inert gas, or gasifiable substances, and the like. Here, gasifiable substances may be, for example, gasifiable liquid.

Next, the hollow tube body 10 may be heated to expand the preset position to form a cavity portion, thereby forming a hollow tube body including a first tube body, a cavity portion, and a second tube body arranged in sequence (step S30). The required cavity portion 12 may be formed by thermal expansion of the preset position by heating (see FIG. 7e).

After the preparation of the hollow tube body 10, the first optical fiber may be fixed to the first tube body, the second optical fiber may be fixed to the second tube body, and the first light guide end face of the first optical fiber and the second light guide end face of the second optical fiber may be provided in the cavity portion and separated at a preset distance (step S40). In step S40, the first optical fiber may be fixed to the first tube body by welding, and the second optical fiber may be fixed to the second tube body by welding.

Optionally, the wall thickness of the hollow tube body may be reduced by performing reducing step on the preset position of the hollow tube body. Therefore, when the hollow tube body is filled with thermal expansive materials and heated, the hollow tube body of the preset position will expand to form a cavity portion. The first optical fiber and second optical fiber may be welded to the hollow tube body, thus bringing the light guide end face of the first optical fiber and the light guide end face of the second optical fiber to be separated from each other, and thereby forming an optical fiber Fabry-Perot sensor with improved sensitivity.

Optionally, the width of the free spectral range may be changed by adjusting the distance between the internal end faces of the two optical fibers (the first optical fiber and the second optical fiber).

FIG. 8 and FIGS. 9a-9e describes another manufacturing method of the optical fiber Fabry-Perot sensor 1. FIG. 9a to FIG. 9e are diagrams illustrating the manufacturing method of the hollow tube body of the fiber optic Fabry-Perot sensor shown in FIG. 8.

In the disclosed manufacturing method of the optical fiber Fabry-Perot sensor 1, the hollow tube body is first prepared, and a first optical fiber is inserted into the hollow tube body and sealing one end thereof (step S100). In step S100, two ends of the hollow tube body (such as a quartz glass tube) may be cut flat. Optionally, the outer diameter of the first optical fiber matches the inner diameter of the hollow quartz glass tube.

In step S100, the first optical fiber may be fixed within the hollow tube body by welding. The welding process may be achieved by optical fiber fusion splicer. Optionally, the prepared hollow tube body may be a quartz glass tube. In this case, the high temperature resistant ability of the hollow tube body may be ensured and the technological applicability thereof may be improved. The hollow tube body may also be a high temperature resistant glass tube, a hollow fiber, or a photonic crystal fiber.

Figure 9A:
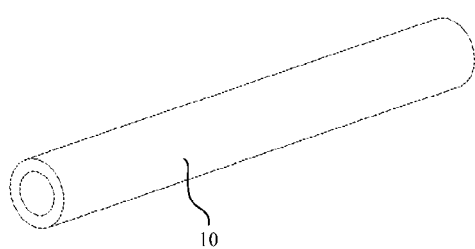
FIG. 9a is a stereoscopic diagram illustrating the starting hollow tube body.
Figure 9B:
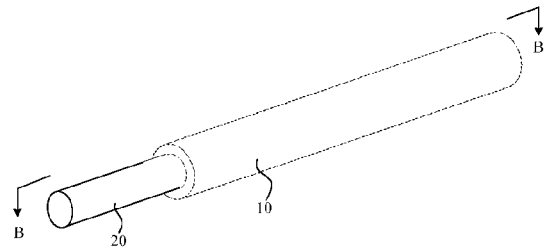
FIG. 9b is a stereoscopic diagram illustrating that the first optical fiber is fixed and the hollow tube is sealed.
Figure 9C:
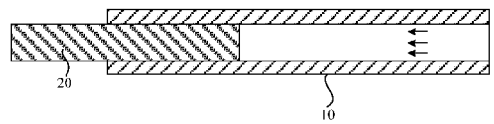
FIG. 9c is a sectional drawing illustrating the section along line B-B shown in FIG. 9b.
Figure 9D:
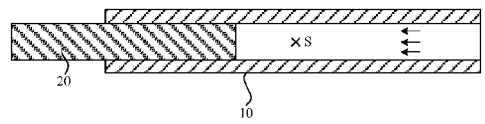
FIG. 9d is a stereoscopic diagram illustrating the discharge performance of the hollow tube body shown in FIG. 9c.
Figure 9E:
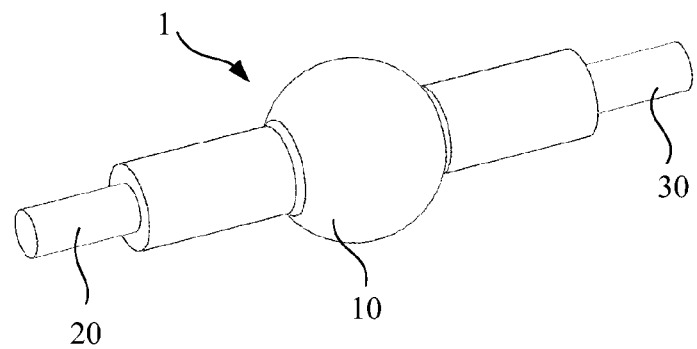
FIG. 9e is a stereoscopic diagram illustrating the prepared hollow tube body.

Next, as shown in FIG. 9c, the other end of the hollow tube body is connected to a high voltage source (step S200). A sealed space is formed in the hollow tube body. In step S200, the internal pressure of the hollow tube body may be adjusted by adjusting the high-pressure source.

Next, the hollow tube body is discharged (see FIG. 9d) so that the preset position expands to form a cavity portion, thereby forming a hollow tube body including a first tube body, a cavity portion, and a second tube body arranged in sequence (step S300). The required cavity portion 12 may be produced by thermal expansion when heating the preset position (see FIG. 9e). In step S300, by adjusting the time and intensity parameters of discharge, the high voltage state of the hollow tube body may be maintained and discharge may be performed at an appropriate position. In this case, because the internal pressure of the hollow tube body is higher than the external pressure thereof, the discharge position (preset position) S (see FIG. 9d) of the hollow tube body may gradually expand to form a cavity portion, such as a hollow micro bubble.

After the preparation of the hollow tube body 10, the second optical fiber may be inserted and fixed into the second tube body, and the first light guide end face of the first optical fiber and the second light guide end face of the second optical fiber may be provided within the cavity portion and separated at a preset distance (step S400).

Optionally, multiple discharge positions may be selected and step S300 may be repeated. A plurality of cavity portions may be obtained, that is, a plurality of cavity portions are formed between the first tube body and the second tube body.

By performing discharge at the preset position of the hollow tube body, the hollow tube body of the preset position may expand to form a cavity portion. Then, the first optical fiber and the second optical fiber are welded to the hollow tube body, and bringing the light guide end face of the first optical fiber and the light guide end face of the second optical fiber arranged separately, which may form an optical fiber Fabry-Perot sensor with improved sensitivity.

Optionally, the width of the free spectral range may be changed by adjusting the distance between the internal end faces of two optical fibers (the first optical fiber and the second optical fiber).

Hereafter, the disclosed embodiments of the optical fiber Fabry-Perot sensor 1 are described with reference to some examples of the manufacturing methods.

Example 1 of the First Embodiment

In this example, the two end faces of a hollow quartz glass tube are cut flat by a fiber cutter. The hollow quartz glass tube has an inner diameter of about 100 µm to 300 µm and an outer diameter larger than the inner diameter and of about 200 µm to 400 µm. Next, use a fiber fusion splicer (model: FITEL S183 Version 2) to melt one end of the hollow quartz glass tube to collapse and seal, and the other end thereof is connected to an air pump (model: ConST 162).

Next, the air pump is adjusted so that the internal pressure of the hollow quartz glass tube reaches between 110 kPa and 120 kPa (absolute pressure). The discharge time of the fiber fusion splicer is adjusted to be 400 ms to 1000 ms, and the discharge intensity to be 50 units to 200 units, maintaining the internal pressure of the hollow quartz glass tube, and discharge is performed at an appropriate position for 3-6 times. During this process, due to the effect of pressure difference between inside and outside of the hollow quartz glass tube, the discharge position of the hollow quartz glass tube may expand to form a roughly hollow spheroid (for example, a micro bubble).

Then, the hollow quartz glass tube with the cavity portion is removed from the optical fiber fusion splicer, the high voltage source is removed, and both ends are re-cut flatly with a fiber cutter. In the manual mode of the optical fiber fusion splicer, two optical fibers (type: Changfei G652D) with both ends cut flat are inserted face to face into the hollow quartz glass tube with the hollow spheroid in turn, and the discharge time is re-adjusted to be 400 ms to 1000 ms, and the discharge intensity is 50 units to 200 units. The two fibers are respectively welded to the hollow quartz glass tube, and the distance between the two internal end faces of the two fibers is adjusted during the welding process, so that the distance is about 5 µm to 100 µm, and in this case, the width of the free spectral range is about 2.4 nm to 48 nm. Now, the diameter of the hollow spheroid is about 200 µm to 500 µm, the thinnest wall thickness is about 2 µm to 6 µm, and the sensitivity of the sensor is about 200 µm/µε to 800 µm/µε.

Example 2 of the First Embodiment

In this example, the two end faces of a hollow quartz glass tube 2 are cut flat by a fiber cutter. The hollow quartz glass tube 2 has an inner diameter of about 100 µm to 300 µm and an outer diameter larger than the inner diameter and of about 200 µm to 400 µm. Next, use a fiber fusion splicer (model: FITEL S183 Version 2) to melt one end of the hollow quartz glass tube to collapse and seal, and the other end thereof is connected to an air pump (model: ConST 162).

Next, the air pump is adjusted so that the internal pressure of the hollow quartz glass tube reaches between 110 kPa and 120 kPa (absolute pressure). The discharge time of the fiber fusion splicer is adjusted to be 400 ms to 1000 ms, and the discharge intensity to be 50 units to 200 units, maintaining the internal pressure of the hollow quartz glass tube, and discharge is performed at an appropriate position for 3-6 times. During this process, due to the effect of pressure difference between inside and outside of the hollow quartz glass tube, the discharge position of the hollow quartz glass tube may expand to form a roughly hollow spheroid (for example, a micro bubble).

Then, the fiber fusion splicer electrode is moved to a position where is 300 µm to 800 µm away from the center of the hollow spheroid, and the above steps are repeated to obtain another hollow spheroid. Next, the hollow quartz glass tube with two hollow spheroids is removed from the fiber fusion splicer and the high voltage source is removed, and both ends are re-cut flatly with a fiber cutter. In the manual mode of the optical fiber fusion splicer, two optical fibers (type: Changfei G652D) with both ends cut flat are inserted face to face into the hollow quartz glass tube with the hollow spheroid in turn, and the discharge time is re-adjusted to be 400 ms to 1000 ms, and the discharge intensity is 50 units to 200 units. The two fibers are respectively welded to the hollow quartz glass tube, and the distance between the two internal end faces of the two fibers is adjusted to be 50 units to 200 units during the welding process, and in this case, the width of the free spectral range is about 1.2 nm to 30 nm. At this time, the diameter of the hollow spheroid is about 200 µm to 400 µm, the thinnest wall thickness is about 2 µm to 6 µm, and the sensitivity of the sensor is about 200 µm/µε to 800 µm/µε.

Second Embodiment

Figure 10:
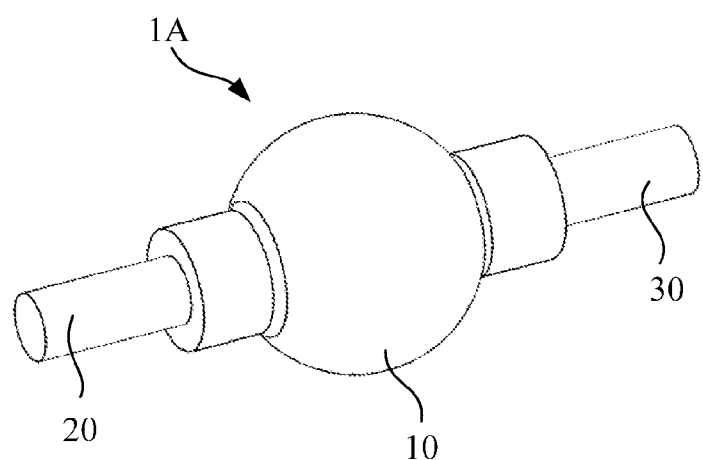
FIG. 10 is a schematic diagram illustrating the stereoscopic structure of the optical fiber Fabry-Perot sensor according to the second embodiment.

FIG. 10 is a schematic diagram illustrating the stereoscopic structure of the optical fiber Fabry-Perot sensor according to the second embodiment. FIG. 11a to FIG. 11e are diagrams illustrating the manufacturing method of the fiber optic Fabry-Perot sensor shown in FIG. 10. FIG. 11a is a stereoscopic diagram illustrating the hollow tube body. FIG. 11b is a stereoscopic diagram illustrating that the first optical fiber is fixed and the hollow tube is sealed. FIG. 11c is a sectional diagram illustrating the section along line C-C shown in FIG. 11b. FIG. 11d is an interception diagram illustrating the discharge performance of the hollow tube body shown in FIG. 11c. FIG. 11e is a stereoscopic diagram illustrating the prepared hollow tube body.

The difference between the optical fiber Fabry-Perot sensor 1A and the optical fiber Fabry-Perot sensor 1 is that the first light guide end 21 of the first optical fiber 20 and the second light guide end 31 of the second optical fiber 30 are respectively arranged at two ends of the hollow tube body 10 (see FIG. 10).

When measuring with the optical fiber Fabry-Perot sensor 1A, change of the external mechanical parameters (stress, tension, pressure, and the like) may be transmitted through the thin wall of the cavity portion. Change of the corresponding mechanical parameters may be effectively reflected by change of the length of Fabry-Perot cavity formed by the end face 21 of the first optical fiber 20 and the end face 31 of the second optical fiber 30. Therefore, the optical fiber Fabry-Perot sensor 1A may effectively improve the measurement sensitivity of the mechanical parameters of the target.

The manufacturing method of the optical fiber Fabry-Perot sensor 1A is basically the same as that of the optical fiber Fabry-Perot sensor 1. The manufacturing method of the optical fiber Fabry-Perot sensor 1 may be directly adopted. The difference is that in the manufacturing process, the end face 21 of the first optical fiber 20 is connected to one end of the hollow tube body 10, and the end face 31 of the second optical fiber 30 is connected with the other end of the hollow tube body. Specifically, in FIG. 11b, the end face of the first optical fiber 20 is connected with one end of the hollow tube body 10. After the discharge heating steps shown in FIG. 11c and FIG. 11c, the end face of the second optical fiber 30 is connected to the other end of the hollow tube body. Thus, the optical fiber Fabry-Perot sensor 1A shown in FIG. 10 or FIG. 11e is obtained.

Optionally, the outer diameter of the first optical fiber 20 may be larger than the inner diameter of the first tube body 11 of the hollow tube body 10 (e.g., a quartz glass tube), and the outer diameter of the second optical fiber 30 may be larger than the inner diameter of the second tube body 13 of the hollow tube body 10.

Optionally, the outer diameter of the first optical fiber 20 may be smaller than the outer diameter of the first tube body 11 of the hollow tube body 10 (e.g., a quartz glass tube), and the outer diameter of the second optical fiber 30 may be smaller than the outer diameter of the second tube body 13 of the hollow tube body 10 (not shown). In this case, the first optical fiber 20 and the first tube body 11, and the second optical fiber 30 and the second tube body 13 may also form a good connection.

Optionally, the outer diameter of the first optical fiber 20 may be equal to or larger than the outer diameter of the first tube body 11 of the hollow tube body 10 (e.g., a quartz glass tube), and the outer diameter of the second optical fiber 30 may be equal to or larger than the outer diameter of the second tube body 13 of the hollow tube body 10 (not shown). In this case, the first optical fiber 20 and the first tube body 11, and the second optical fiber 30 and the second tube body 13 may also form a good connection.

Some embodiments of the disclosure may have one or more of the following effects. The disclosure may provide an optical fiber Fabry-Perot sensor which may improve measurement sensitivity and a manufacturing method thereof. The optical fiber Fabry-Perot sensor as disclosed may effectively improve the measurement sensitivity of the mechanical parameters.

While the invention has been described in detail with reference to the drawings and embodiments, it is understood that the above description does not limit the invention in any form. The present invention may be modified and changed as needed by those skilled in the art without departing from the spirit and scope of the invention, and such modifications and variations are within the scope of the invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An optical fiber Fabry-Perot sensor, comprising:
   a hollow tube body having a first tube body, a cavity portion, and a second tube body sequentially arranged in an axial direction;
   a first optical fiber provided inside the first tube body in the axial direction and having a first light guide end face provided inside the cavity portion; and
   a second optical fiber provided inside the second tube body in the axial direction and having a second light guide end face provided inside the cavity portion;
   wherein:
      the first light guide end face and the second light guide end face are provided face to face at a preset distance;
      an inner diameter of the cavity portion is larger than an inner diameter of either the first tube body or the second tube body.

2. The optical fiber Fabry-Perot sensor of claim 1, wherein the first optical fiber is welded to the first tube body, and the second optical fiber is welded to the second tube body.

3. The optical fiber Fabry-Perot sensor of claim 2, wherein the first optical fiber and the hollow tube body form a first fusion joint, and the second optical fiber and the hollow tube body form a second fusion joint.

4. The optical fiber Fabry-Perot sensor of claim 1, wherein:
   the first tube body, the cavity portion, and the second tube body are continuously formed; and
   a central symmetry axis of the first tube body coincides with a central symmetry axis of the second tube body.

5. The optical fiber Fabry-Perot sensor of claim 1, wherein more than two cavity portions are arranged between the first tube body and the second tube body in the hollow tube body.

6. The optical fiber Fabry-Perot sensor of claim 1, wherein the first tube body, the cavity portion, and the second tube body are integrally formed.

7. The optical fiber Fabry-Perot sensor of claim 1, wherein the hollow tube body is a quartz glass tube, a high temperature resistant glass tube, a hollow fiber, or a photonic crystal fiber.

8. The optical fiber Fabry-Perot sensor of claim 1, wherein the first light guide end face of the first optical fiber is perpendicular to the axial direction, and the second light guide end face of the second optical fiber is perpendicular to the axial direction.

9. An optical fiber Fabry-Perot sensor, comprising:
   a hollow tube body having a first tube body, a cavity portion, and a second tube body sequentially arranged in an axial direction;
   a first optical fiber having a first light guide end face connected with an end of the first tube body; and
   a second optical fiber having a second light guide end face connected with an end of the second tube body;
   wherein:
      the first light guide end face and the second light guide end face are arranged face to face across the hollow tube body; and
      an inner diameter of the cavity portion is larger than an inner diameter of either the first tube body or the second tube body.

10. The optical fiber Fabry-Perot sensor of claim 9, wherein the first optical fiber is welded to the first tube body, and the second optical fiber is welded to the second tube body.

11. The optical fiber Fabry-Perot sensor of claim 9, wherein:
   the first tube body, the cavity portion, and the second tube body are continuously formed;
   a central symmetry axis of the first tube body coincides with a central symmetry axis of the second tube body; and
   a wall thickness of the cavity portion is smaller than those of the first tube body and the second tube body.

12. The optical fiber Fabry-Perot sensor of claim 9, wherein more than two cavity portions are arranged between the first tube body and the second tube body in the hollow tube body.

13. The optical fiber Fabry-Perot sensor of claim 9, wherein the hollow tube body is a quartz glass tube, a high temperature resistant glass tube, a hollow fiber, or a photonic crystal fiber.

* * * * *